Oct. 12, 1926.  
E. D. SMITH  
1,602,716  
MACHINE FOR SEPARATING TAPERED ARTICLES  
Filed May 5, 1921  
8 Sheets-Sheet 2

Oct. 12, 1926.  
E. D. SMITH  
1,602,716  
MACHINE FOR SEPARATING TAPERED ARTICLES  
Filed May 5, 1921    8 Sheets-Sheet 3

Oct. 12, 1926.

E. D. SMITH 1,602,716

MACHINE FOR SEPARATING TAPERED ARTICLES

Filed May 5, 1921    8 Sheets-Sheet 4

Inventor
Edward D. Smith
by Cooper & Dolph
Attorneys,

Oct. 12, 1926.

E. D. SMITH 1,602,716

MACHINE FOR SEPARATING TAPERED ARTICLES

Filed May 5, 1921　　8 Sheets-Sheet 5

Inventor
Edward D. Smith
by Geyer & Popple
Attorneys

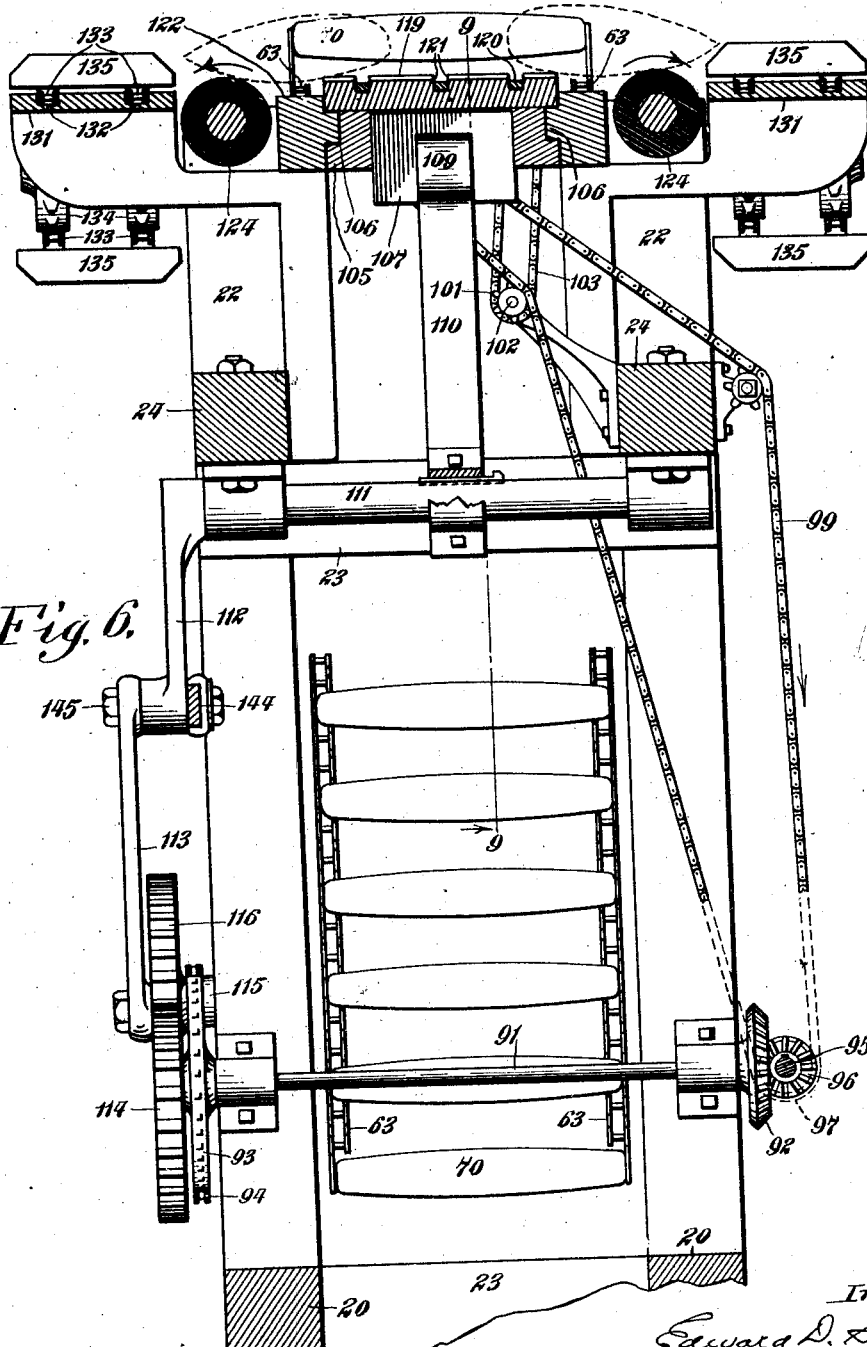

Oct. 12, 1926.
E. D. SMITH
1,602,716
MACHINE FOR SEPARATING TAPERED ARTICLES
Filed May 5, 1921    8 Sheets-Sheet 7
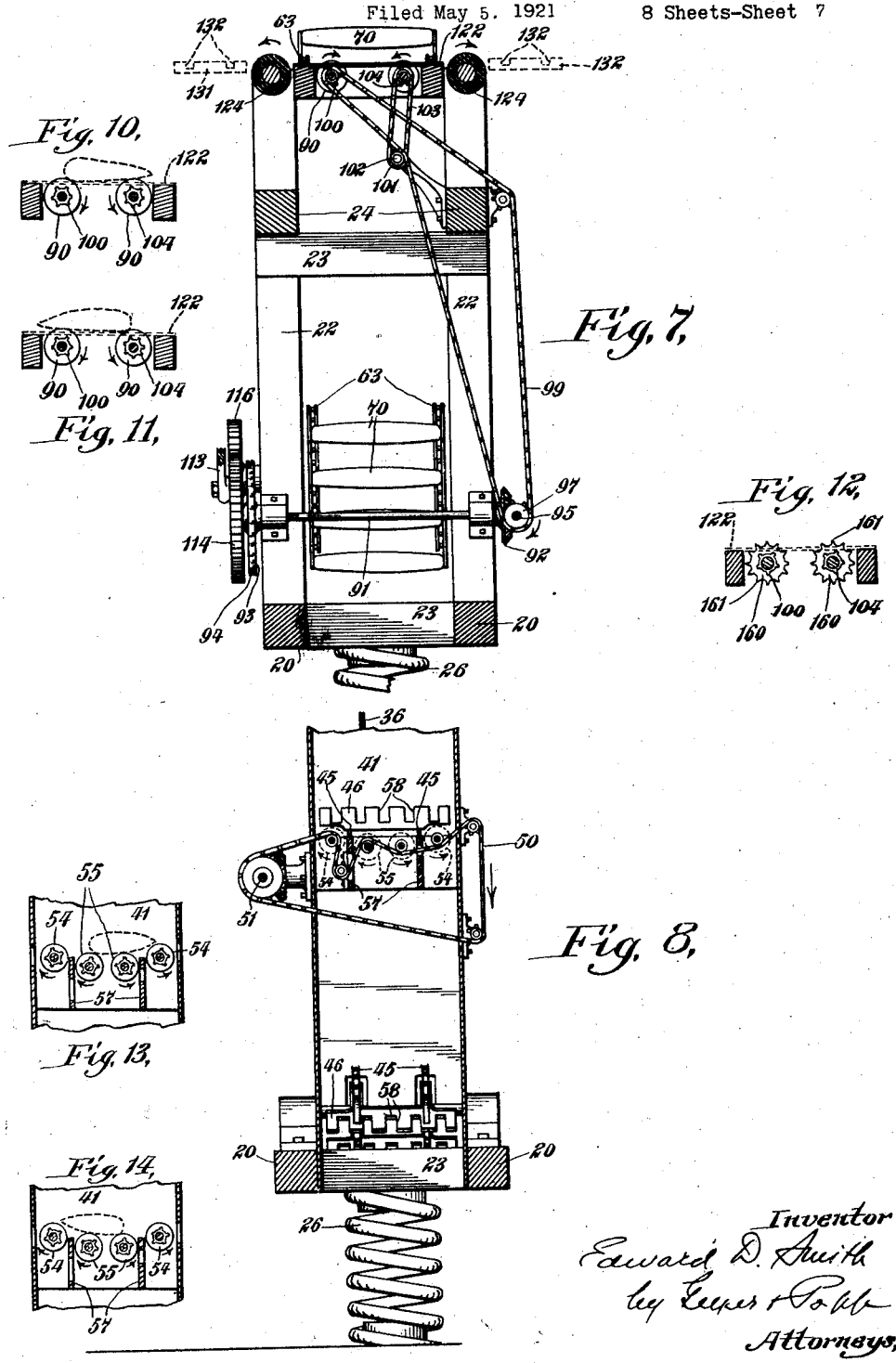

Oct. 12, 1926.
E. D. SMITH
1,602,716
MACHINE FOR SEPARATING TAPERED ARTICLES
Filed May 5, 1921    8 Sheets-Sheet 8
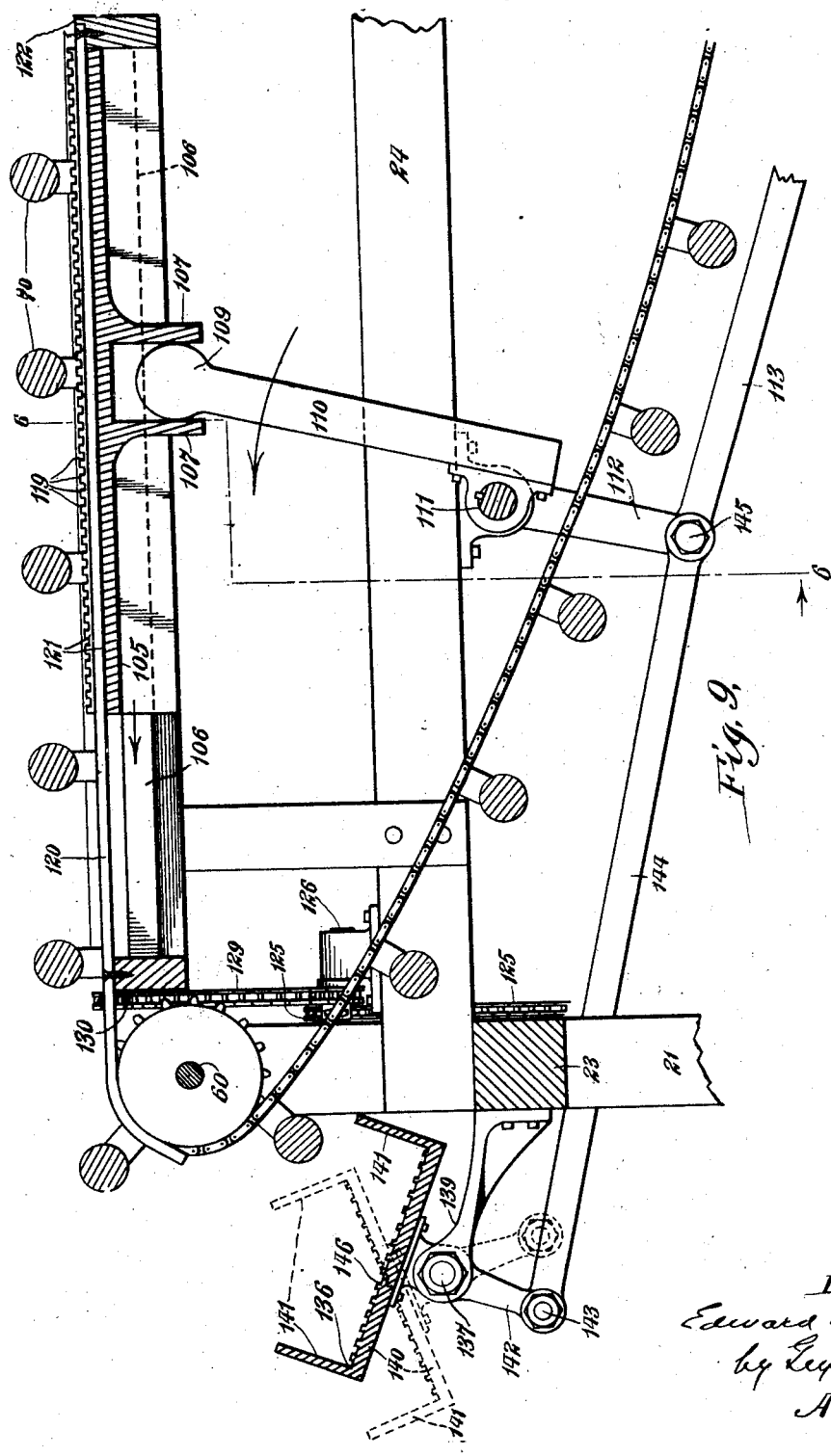

Patented Oct. 12, 1926.

1,602,716

UNITED STATES PATENT OFFICE.

EDWARD D. SMITH, OF BUFFALO, NEW YORK, ASSIGNOR TO PEERLESS HUSKER COMPANY, OF BUFFALO, NEW YORK, A COPARTNERSHIP.

MACHINE FOR SEPARATING TAPERED ARTICLES.

Application filed May 5, 1921. Serial No. 467,044.

This invention relates to a machine for automatically classifying or separating a heterogeneous mass of tapered articles (such as corn, carrots, pears, etc.) into two distinct groups, all of the articles in each group having their butt ends uniformly pointing in the one direction and their tail ends pointing uniformly in the opposite direction.

One of the objects of the invention is to provide a machine of this character which is entirely automatic in its operation and which will continuously and uninterruptedly perform its functions irrespective of how the tapered articles being handled may vary in size, shape or character. A further object of the invention is to not only classify or separate the tapered articles into two groups having the tapered articles in each group pointing in the same direction, but also to so position all of the tapered articles of each group, so that their butt ends are all alined with each other. A still further object of the invention is to provide emergency means whereby any particular recalcitrant tapered articles which do not quickly and properly separate themselves from the main body of heterogeneous tapered articles, are given prolonged and individual treatment which continues until the desired separation is effected. Further objects and advantages of the invention are disclosed more exactly in the following description and accompanying drawings, wherein—

Figure 1:
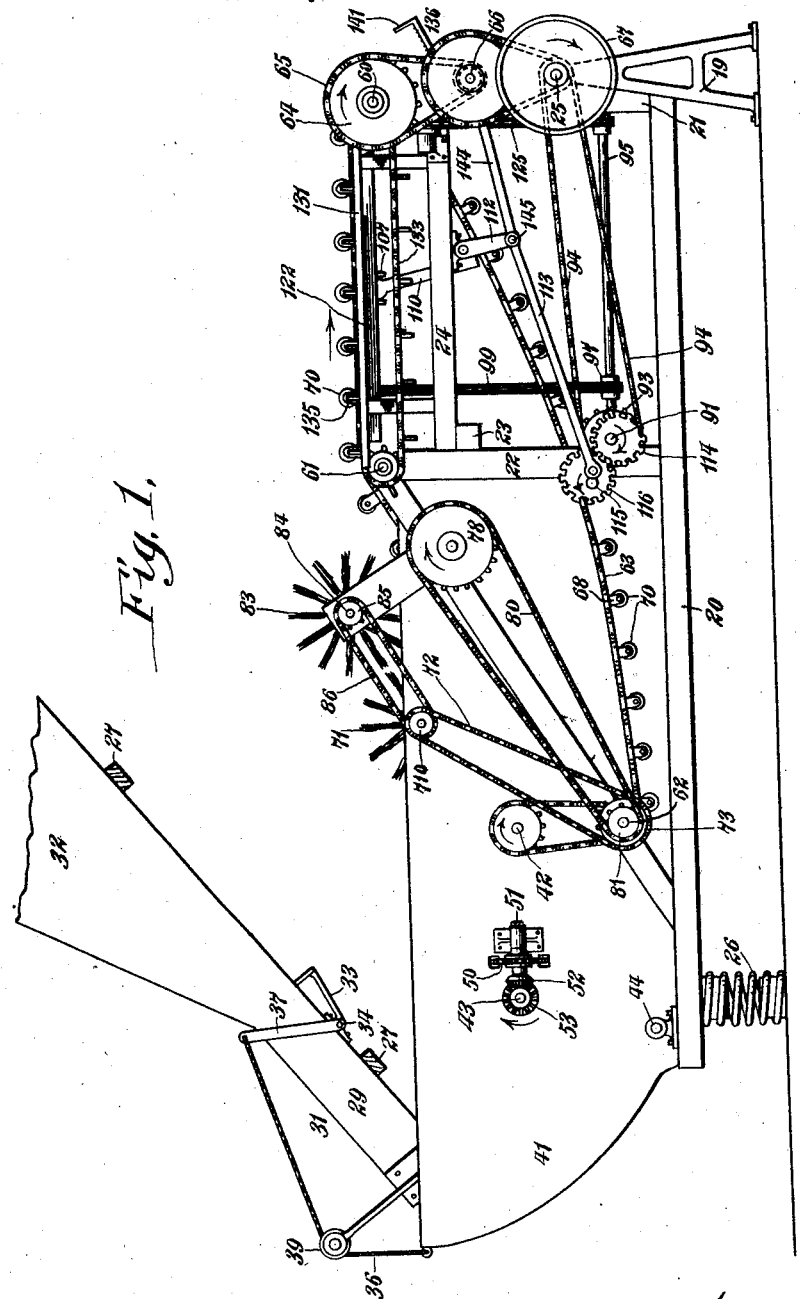
Figure 2:
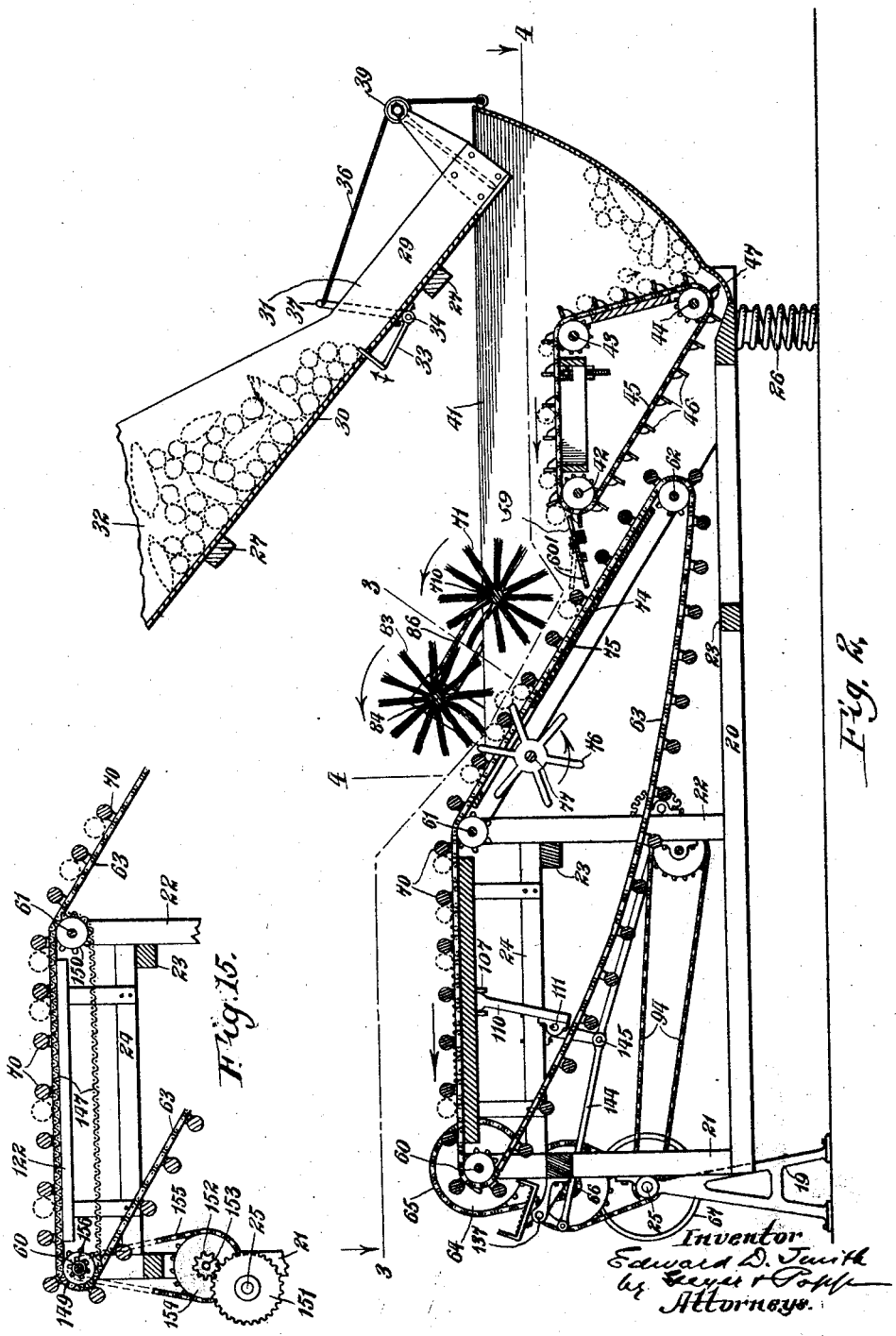
Figure 3:
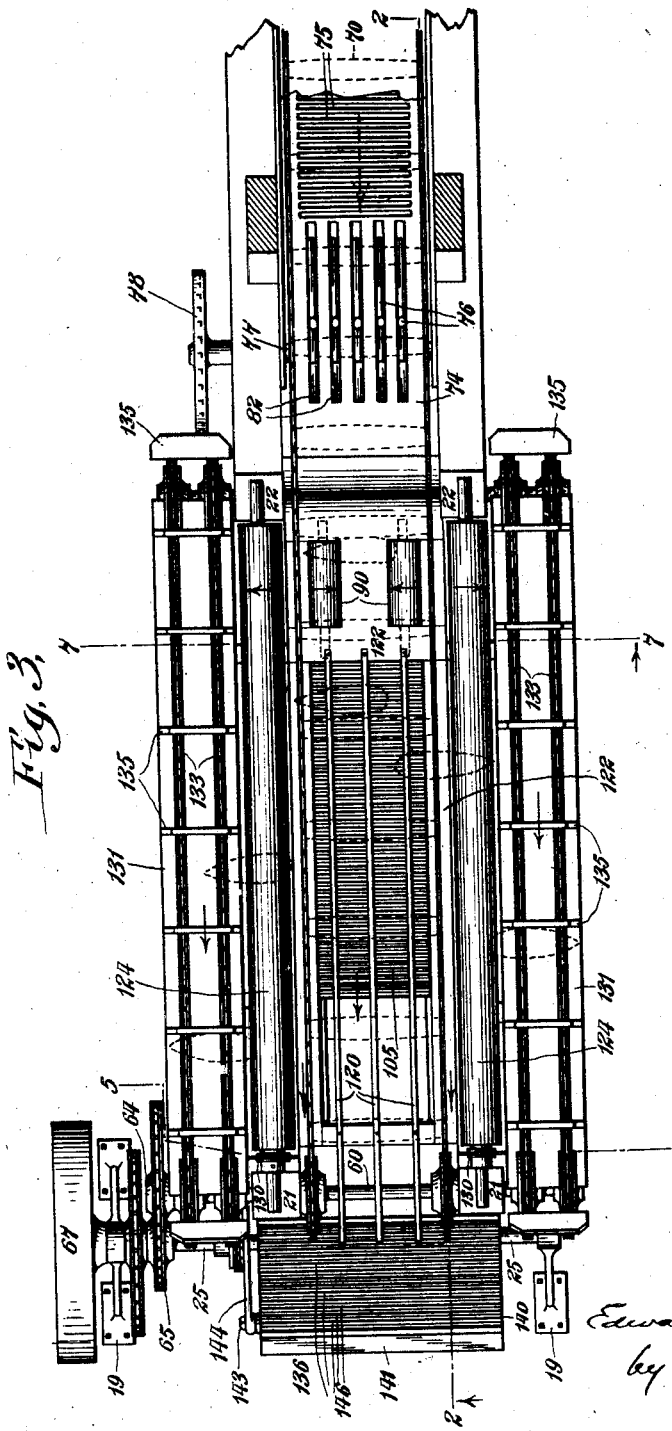
Figure 4:
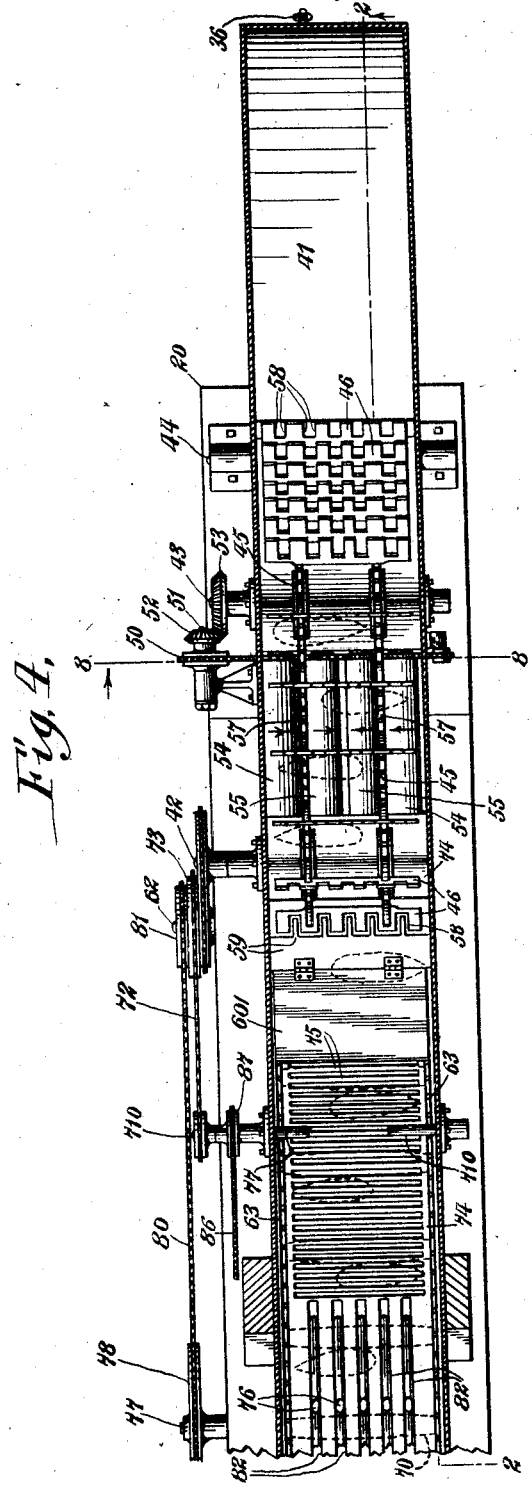
Figure 5:
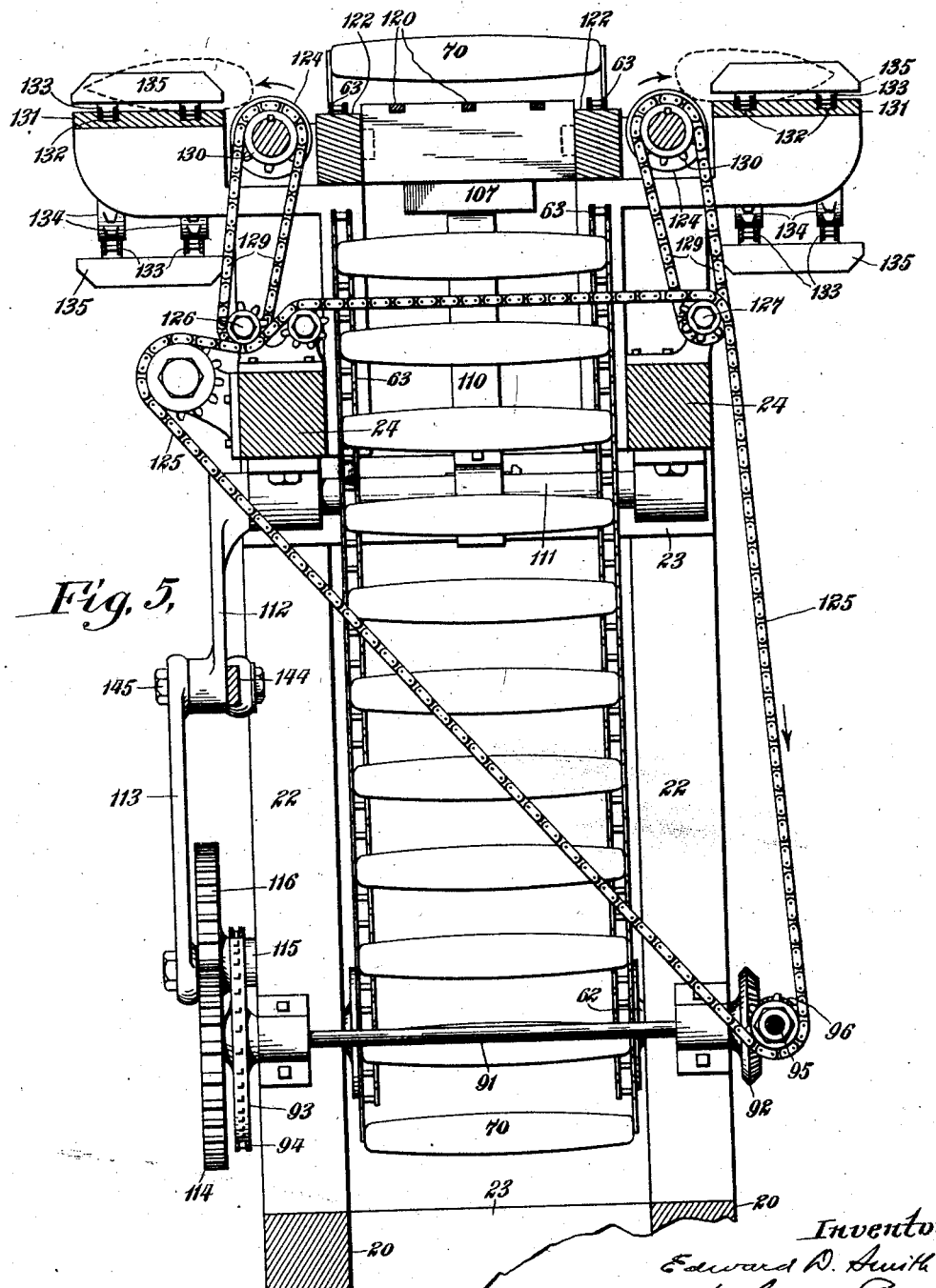

Figure 1 is a rear side view of the entire separator, showing particularly the driving mechanism. Figure 2 is a vertical longitudinal section of the same but looking from the front side thereof and taken on line 2—2, Figs. 3 and 4. Figures 3 and 4 are fragmentary top plan views (with parts in section) of the rear and front ends respectively of the separator and taken respectively on lines 3—3 and 4—4, Fig. 2. Figures 5 and 6 are enlarged fragmentary vertical transverse sections through the separator taken respectively on line 5—5, Fig. 3 and line 6—6, Fig. 9. Figures 7 and 8 are somewhat enlarged fragmentary vertical transverse sections taken respectively on line 7—7, Fig. 3 and line 8—8, Fig. 4. Figure 9 is an enlarged fragmentary vertical longitudinal section through the rear end of the separator and taken on line 9—9, Fig. 6. Figures 10 and 11 are detached vertical, transverse sections showing the operation of the decentering rolls associated with Fig. 7. Figure 12 is likewise a detached, vertical, transverse section showing a pair of decentering rolls of modified construction having toothed prongs. Figures 13 and 14 are detached, vertical, transverse sections showing the operation of the decentering and centering rolls which are associated with Fig. 8. Figure 15 is a fragmentary, detached, vertical, longitudinal section showing a modified separating means consisting of a mesh belt.

Similar characters of reference refer to like parts throughout the several views.

It is obvious to those skilled in the art that the results and advantages of the present invention may be obtained by machines which vary considerably from the disclosure of the herein drawings. In fact, this machine must be altered considerably in detail for different tapered articles having different characteristics. For instance, carrots could not be properly handled in a machine which is suitable for handling pears, nor corn in a machine which is suitable for handling cucumbers or beets. Furthermore, a number of optional devices are shown in the accompanying drawings which provide an additional surety of operation and which are only required in the handling of vegetables, fruits, or other tapered articles, which have certain inherent characteristics and hence these additional devices may, in many cases, be dispensed with entirely.

The machine shown in the drawings has a main rigid frame consisting of a longitudinal, parallel pair of lower frame beams 20,—a rear set of upright posts 21,—a central set of upright posts 22 (both of said posts extending upwardly from the upper faces of said main frame beams 20),—a number of cross tie bars 23,—and a pair of upper longitudinal frame bars 24 secured to the upper portions of the rear and central posts 21 and 22 respectively. The rear end of the main frame is pivotally supported by a pair of standards 19 whose upper ends or heads are journaled on a transverse drive shaft 25, which is in turn journaled on and thereby supports the rear upright posts 21 of the main frame of the machine. The front end of the main frame is supported upon a stiff compression spring 26. The whole frame is thus resiliently and pivotally mounted so as to be capable of moving about the drive shaft 25, as an axis.

Arranged over the front end of the machine are a pair of suitable stationary cross bars 27, which rigidly support a supply chute 29 preferably open on its upper side and having the usual inclined flat bottom 30 and side walls 31. The flow of tapered articles which flows from the main supply bin 32 down the supply chute is controlled by a flow regulator or bell-crank control rake 33 which is provided with the usual upstanding tines and is pivoted to the supply chute at 34. The tines of said control rake project upwardly through a suitable slit or aperture in the bottom 30 of said supply chute, the amount of projection determining whether or not any tapered articles are permitted to flow down said supply chute. The position of the control rake is governed by the vertical position of the front end of the main separator frame. This is accomplished by any suitable means, for instance by means of a flexible cable 36, the one end thereof being secured to the upstanding arm 37 of the bell-crank control rake 33, while the other end of said cable is suitably secured to the front end of the main frame of the separator, said cable passing over a suitable guide pulley wheel 39 intermediate of its length, said pulley wheel being journaled suitably on the supply chute 30. By this construction, the tapered articles are permitted to flow from the aforesaid supply chute until a sufficient amount have been dropped into the front part of the separator, proper, whereupon said front part becomes depressed by reason of the weight of said tapered articles, and thereupon the flexible cable 36 is drawn taut and the bell-crank, control rake 33 moved upwardly, thereby cutting off the further supply of the tapered articles until those already deposited have been sufficiently removed to permit of the front end of the conveyor proper again rising under the influence of the compression spring 26.

Arranged at the forward end of the main frame of the separator is a feeding hopper 41 which receives the tapered articles from the mouth of the supply chute 29. Arranged within the said feeding hopper and suitably journaled in the main frame of the separator, are a number of transverse shafts 42, 43 and 44 each of which is provided with a pair of symmetrically disposed sprockets carrying selection conveyor chains 45. The shaft 42 is suitably power driven in a manner hereinafter described (see Fig. 1.) Secured to said chains and extending laterally and outwardly therefrom are a plurality of notched selection conveyor flights 46, which are spaced apart a distance not much greater than, and approximately equal to, the thickness of the tapered articles being handled. The upper front transverse shaft 43 is disposed substantially vertically above, or at least only a short distance rearwardly, of the lowermost transverse shaft 44. Hence the tapered articles as they rise on the front substantially vertical stretch of said selection conveyor are taken up, with only one tapered article, at most, being permitted to lie transversely only on each flight. If one of the flights ascends with no load at all no harm is done. On the other hand, no tapered article can rest on any one of said flights except in a transverse position. Furthermore if more than one tapered article is picked up by any one of the flights 46, one of these ears is caused to fall off for two reasons, 1.—because the flights are spaced apart a distance equal to a little more than the thickness of a tapered article and 2.—because the inevitable vibration of the whole separator causes the additional and unstably supported tapered article to roll off and fall back into feeding hopper 41. To prevent any tapered article from falling through the bottom of the feeding hopper, the lower portion of the same is of a shape which is transversely semi-cylindrical at 47, the axis thereof being the axis of the lower transverse shaft 44. Furthermore the outer edges of said flights travel in close proximity to the inner surface of said semi-cylindrical portion 47, so that there is not any possibility of the tapered articles dropping downwardly between said flights and said semi-cylindrical portion.

As the tapered articles are carried in a transverse position and moved horizontally rearwardly upon the upper horizontal stretch of the selection conveyor, they pass over two pairs of rolls 54 and 55 (see Figs. 8, 13 and 14) which are disposed longitudinally and are suitably journaled in the main frame of the separator. Both pairs of rolls are suitably driven by means of a belt chain 50 which derives its power from a longitudinal jack shaft 51 having a bevel pinion 52 which meshes with a bevel gear 53 mounted on the transverse, selection conveyor shaft 43. The latter is driven from the upper, rear, transverse selection-conveyor or shaft 42 by means of the selection conveyor chains 45 aforementioned. The outer or centering pair of longitudinal rolls 54 are disposed somewhat above the inner or decentering rolls 55, but in all cases the upper peripheries of all four rolls are driven inwardly toward the center of the conveyor. The outer, centering rolls merely serve to move toward the center any tapered articles which are too far off center. i. e., any such as are brushing against the side walls of the feeding hopper and are too far off on the one side of the selection conveyor. This action is carried out irrespective of whether it is the butt or the tail end of the tapered article that is on the outside. The decentering rolls however automatically distinguish between the tapered articles which are pointing transversely in different directions. In Fig. 13, for instance, the tapered article is shown with its tail pointing toward the right, i. e., the action of the inner or decentering rolls 55 operate to decenter this particular tapered article toward the right. As shown in Fig. 14 however, a tapered article which has its tail pointing toward the left is caused to be decentered toward the left. The reason for this differential action resides in the fact that the center of gravity of an ordinary tapered vegetable or fruit is located well toward the thick or butt end thereof. This means that the tractive effect or the friction between any roll and the butt end of the tapered article is much greater than the traction or friction between any roll and the tail end of said tapered article. Thus the roll which is under the butt end of the tapered article will cause a movement of said tapered article despite any opposition of other rolls which are to be sure, turning in the opposite direction but are bearing upwardly against the lighter or tail portion of said tapered article. It should be noticed, in passing, that the cross sectional area or open space between the upper portions of the adjacent rolls on either side of the separator is occupied by the aforesaid selection conveyor chains 45 so that any slapping or undue lateral movement of said chains is not liable to cause an interference with any of the rolls. The chains are preferably supported by, and run upon the upper face of, a suitable pair of longitudinal runways 57, suitably secured to the main frame of the separator.

Referring now to Figs. 2 and 4, we find a transverse removing comb 59 secured rigidly to the main frame of the separator and having its forwardly and substantially horizontally extending tines projecting into the path of said rearwardly moving selection-conveyor flights 46, said tines passing through the lateral notches 58 which are formed in each of said flights and extend from the outer edges thereof inwardly toward the selection conveyor chains 45 to which said flights are secured. The action of said removing comb is to gently but absolutely positively force off the tapered articles from the selection-conveyor flights. Hinged to and slanting rearwardly and downwardly from the rear transverse edge of said stationary removing comb is a transversely disposed depositing door 601 which receives the tapered articles from the removing comb 59.

Journaled transversely in the main frame of the separator are three main conveyor shafts 60, 61 and 62 and each shaft is provided with a pair of main conveyor sprockets which carry a pair of main conveyor chains 63. These chains form an upwardly moving inclined upper stretch at the central part of the separator,—a rearwardly moving horizontal stretch at the rear part of the separator, and a lower, idle or return stretch at the lower part of the separator. The chains are driven from the rearmost upper shaft 60, which (see Figs. 1 and 3) is provided at its extreme outer end with a large sprocket wheel 64 carrying a belt chain 65 driven from the main transverse drive shaft 25 through an intermediate jack or stub shaft 66 provided with a suitable pair of sprocket wheels. Said main drive shaft 25 carries a belt pulley wheel 67 at its extreme outer end, the same being belted to any suitable available source of power. The main conveyor chains 63 are provided at suitable intervals with laterally outwardly extending arms 68 in whose outer ends are journaled transverse rotatable flights 70, which are adapted to carry the tapered articles longitudinally in a transverse position similar to the rigid selection-conveyor flights 46. Each of these rotatable flights is centrally thickened and has its opposite ends tapered somewhat or thinned down, so that each half of each rotatable conveyor flight is of the shape of a truncated cone.

These rotatable, main-conveyor flights 70 move upwardly and rearwardly beneath the depositing door 601, elevating the same successively as they pass thereunder, friction being eliminated by the fact that these flights 70 are rotatably mounted on their main conveyor chains 63. The main conveyor chains with their rotatable flights 70 and the selection conveyor flights 46 are, of course, moved in synchronism and as the aforesaid depositing door rides over and successively falls down behind each one of said rotatable flights 70, a tapered article is caused to roll down upon said depositing door from the rearmost selection conveyor flight 46. It should be noted that this tapered article is not dropped down upon the main conveyor, but is gently rolled down a gentle incline and rolled down all the way to its final position. This would not occur if the depositing door were not hinged.

If a tapered article should roll down this depositing door 601 when the latter is in its elevated position, said tapered article is prevented from rolling over the rear side of the particular rotatable flight 70 which is supporting said door 601 for two reasons, 1.— because said depositing door in its elevated position slopes obliquely upwardly and rearwardly thereby impeding the rolling momentum of said tapered article for so long, and so long only, as said door is in its elevated position and 2.—because of a rotatable brush 71 which is mounted on a transverse shaft 710 suitably journaled in the main frame of the separator and driven by a belt chain 72 from a sprocket 73 which latter is secured to and thereby driven by the lower, front main conveyor shaft 62. The lower bristles of this brush 71 travels in a direction contrary to and in juxtaposition with the upper surface of the tapered articles moving longitudinally beneath said brush. Therefore no tapered article can roll down the depositing door 601 (when the latter is in its elevated position) or pass between the said brush and the tapered article which is already properly in position in front of the adjacent flight 70.

The main conveyor with its rotatable flights 70 causes of course a longitudinal movement of the tapered articles. The latter are however, not supported by said conveyor but are supported by an inclined supporting plate 74 which is provided, on its upper face, with transverse corrugations 75. If only a single tapered article is between any certain pair of rotatable flights 70, the action of these corrugations is to rotate the tapered article up the incline, this rolling action being facilitated by the fact that the flights 70 are journaled on the main conveyor chains 63. One advantage of this rolling action is that, if any of the tapered articles being handled have loose, laterally projecting portions, leaves or stems these loose portions will be compacted and rolled flat and smooth against the main body of each tapered article. The value of this compacting action is hereinafter described.

A further beneficial result is obtained by this rolling action whenever, accidentally, it happens that two tapered articles are disposed between two adjacent rotatable flights 70. In such a case the rearmost tapered article is rotated as before. The foremost of the two tapered articles however is subjected to two rolling forces which oppose each other and which tend to cause the front tapered article to be thrown up and out of the way. If the space between the next succeeding pair of rotatable flights 70 is unoccupied, this extra tapered article will fall therein and thereafter act in a legitimate manner. If this condition does not occur immediately, the process will be continued until this extra tapered article does find a suitable welcome vacancy between two adjacent rolls 70.

Additional precautions are taken to prevent two tapered articles from remaining between two adjacent rotatable flights 70, consisting of a star-shaped knock-out spider 76, which is suitably mounted on a shaft 77 journaled transversely in the main frame of the separator. To the extreme outer end of this shaft 77 is secured a sprocket 78 (see Fig. 1) engaging a belt chain 80 driven by a sprocket 81 on the aforesaid lower front, main conveyor shaft 62. The radially projecting arms of this knock-out spider pass in succession through a plurality of longitudinal slots 82 formed suitable in the inclined, supporting plate 74. This spider is rotated in synchronism with the longitudinal movement of the rotatable flights 70, and as each of said flights comes into juxtaposition with said spider, one of the arms of the latter swings forwardly up and just behind the rear face of the adjacent flight 70. This movement does not touch or interfere with any tapered article which is in its proper position on the front side of the adjacent rear flight 70. But if more than one tapered article is being carried longitudinally by any one of said flights, then the foremost of said tapered articles is pushed up and out of the way by one of the arms of said spider as shown in Fig. 2. This displaced, illegitimate tapered article is then forced toward the front of the separator by reason of an auxiliary brush 83 which is mounted on a suitably journaled transverse shaft 84 carrying a sprocket 85 at its extreme outer end. This sprocket is driven by a chain belt 86 whose front turn passes around a sprocket 87 mounted on the other rotatable brush shaft 77 aforementioned. The lower bristles of the auxiliary brush 83 not only travel in juxtaposition to the upper surfaces of the tapered articles which are lying on the main conveyor, but said bristles also travel in juxtaposition to the outer ends of the arms of said knock-out spider 76. Thus the objectionable or extra tapered article is first lifted out of the space between the rotatable flights 70 and is then forcibly brushed back and out of the way without any possibility of crowding in between said knock-out spider and the said auxiliary brush 83.

As the main conveyor reaches the top of the inclined supporting plate 74, it passes around the sprockets on a transverse shaft 61 and then moves horizontally and longitudinally rearwardly of the machine. The tapered articles are now subjected to the action of a pair of auxiliary, preparatory decentering rolls 90, which are horizontally and longitudinally disposed and are suitably journaled in the main frame of the machine. The driving of the same may be effected in any suitable manner, such for instance as that shown in Fig. 7, wherein is shown a transverse shaft 91 journaled on the main frame posts 22 of the machine and carrying a bevel gear 92 at its one end and a large sprocket wheel 93 at its other. Passing around said sprocket wheel 93 is a chain belt 94 which is driven by a small sprocket wheel on the main drive shaft 25. Suitably journaled on the main frame of the machine is a secondary longitudinal shaft 95 carrying a bevel pinion 96 at its forward end which meshes with the aforesaid bevel gear 92 and also carries a small sprocket wheel 97 rearwardly of said bevel pinion 96. This sprocket (see Fig. 7) drives a chain belt 99 whose upper end passes around a sprocket 100 mounted on one of the decentering rolls and whose intermediate part engages with an intermediate sprocket 101 mounted on a suitably journaled jack shaft 102. The latter drives a supplemental chain belt 103 whose upper turn engages with a sprocket wheel 104 mounted on the other one of said decentering rolls 90. The decentering action of these rolls 90 is graphically seen in Figs. 10 and 11, the action being similar to that of the primary decentering rolls 55 heretofore described, i. e., each tapered article is given a primary movement toward its tail end, said movement being laterally of the machine but co-axially longitudinal of said tapered articles. A modified pair of decentering rolls 160 are shown in Fig. 2, said rolls in this case being provided with a plurality of pointed knobs, teeth or protuberances 161 which facilitate the tractive effect of said rolls upon the tapered articles which they support.

The tapered articles then continue to move (while in a transverse position) longitudinally of the machine until they roll over an oscillatory separator 105, it being understood that said separator operates to support said tapered articles while the main conveyor with its rotatable flights 70 merely effects a longitudinal movement of the same. The separator is longitudinally slidably mounted on a pair of horizontal guide flanges or ribs 106 which are formed on the main frame of the machine. Formed centrally on the lower face of said separator 105 is a pair of vertical transverse thrust walls 107 spaced longitudinally apart from each other. Received between the inner opposing faces of said thrust walls 107 is the upper rounded head 109 of a rocker arm 110 which is suitably secured to a transversely journaled rock shaft 111. The one outer end of said rock shaft carries a crank arm 112 which is pivoted to a connecting rod 113. The latter is driven from the aforementioned transverse shaft 91 in a peculiar and novel manner as follows:

Secured eccentrically to said shaft 91 is a constant angular speed driving gear 114, whose peripheral speed however is not constant. This gear has an annular outer rim provided with suitable gear teeth, the peculiar knob shaped gear teeth shown in the drawing having been found to be more satisfactory than ordinary convolute gear teeth. Journaled transversely and suitably on the main frame of the machine is a jack-shaft 115 carrying an eccentric, variable-angular speed, driven gear 116, whose outer rim is annular and is provided with suitable gear teeth which mesh with the teeth of the constant angular speed gear 114. By means of this construction, the jack shaft 115 is caused to first rotate very rapidly for one half a revolution and then caused to rotate very slowly the next half revolution, the shaft 91 (which drives the same) being however rotated at a constant speed by the chain belt 94 aforementioned. The forward end of the connecting rod 113 is eccentrically pivoted to said variable speed gear 116. Thus the oscillatory separator 105 is caused to move irregularly, i. e., its longitudinal rearward movement is fast whereas its longitudinal forward movement is relatively slow. It is preferable to have these two speeds so proportioned that the speed of said separator relative to the conveyor is approximately the same in either direction. The oscillating separator is also preferably provided with a considerable number of transverse corrugations 119. It is also preferable to provide a number of stationary, longitudinal grid bars 120, the opposite ends of the same being suitably secured to the main frame of the machine and the intermediate parts of the same being slidably received within a number of longitudinal slits 121 formed in the upper face of the oscillating separator 105. The purpose of these grids is to prevent the tapered articles from falling through the middle part of the machine when the oscillatory separator moves one way or the other out of engagement with said tapered articles, i. e. away from under the same, and when furthermore said tapered articles are not otherwise supported by the main stationary horizontal supporting plate 122. These grid bars are disposed considerably below the surface of the said corrugations 119 of the separator, so that said grids in no way interfere with the contact between the tapered articles and the upper surface of said separator.

The action of the separator upon the tapered articles moving longitudinally upon its upper surface (but arranged in a transverse position relatively thereto) is best shown in Fig. 3. The general principle of operation may be stated as follows: If a tapered or conical article is in a transverse position and is caused to roll, it will move bodily transversely toward its apex. This action will be greatly facilitated and quickened if said article is first permitted to roll some distance in an arc shape path and is then brought suddenly into contact with a transverse member, which operates to cause the butt end of said article to be thrown toward the center of this imaginary arc. If then said tapered article be rolled in an arc in the opposite direction and again comes forcibly into contact with a parallel transverse member, it is seen that said tapered articles may be moved toward their tail ends at a comparatively high rate of speed. In the present invention, this alternating rolling action is accomplished by the co-action of the oscillatory separator 105 which supports the tapered articles and which operates in conjunction with the main conveyor chains 63 and rotatable flights 70 which latter merely longitudinally carry the said tapered articles in a transverse position over the upper surface of said separator.

Journaled suitably in the main frame of the machine is a pair of longitudinal transferring rolls 124 whose peripheries are preferably coated or covered with rough rubber or like material. The rotation of each of these rolls is such that the upper peripheries of the same are moved outwardly, this rotation being obtained by a suitable chain belt 125 driven by the longitudinal shaft 96 aforementioned and operating to drive a pair of longitudinal jack shafts 126 and 127. The latter drive a pair of jack-shaft, chain-belts 129 whose upper turns engage with sprocket wheels 130 secured to the said transferring rolls 124. These rolls act to continue the lateral movement of the tapered articles after the same have been moved laterally off of the aforesaid separator 105. This action of the rolls continues until the tapered articles are moved laterally to the dotted line position of Fig. 5, i. e., until the rolls no longer support said tapered articles and are therefore unable to longer influence the lateral movement of the same.

Arranged outside and alongside of said transferring rolls 124 is a pair of horizontal runways 131 each of which is preferably provided with a pair of chain guideways 132 which latter receive a pair of endless, carrier, chain-belts 133 whose opposite ends pass around pairs of sprockets 134. The rear sets of sprockets are mounted on and driven by the rearmost transverse, main conveyor shaft 60 while the front sets of sprockets 134 are mounted on the intermediate, transverse, main conveyor shaft 61. Secured suitably to said carrier chain-belts 133 are a number of carrier flights 135 which are preferably spaced apart a distance equal to the spacing of the main-conveyor, roller flights 70. These flights operate to pick up the tapered articles after they have been moved laterally off of the transfer rolls 124, and carry the same longitudinally to the rear end of the runways 131, where they fall off or are deposited onto any suitable conveyor (not shown), or where in the case of corn in the husk, the butts are cut off by any suitably arranged and operated saw or other device, when the ears will pass directly to a husking machine where the released husks will be removed.

In some very rare cases, the tapered articles are so nearly cylindrical in shape, as to be unable to be separated by the separator 105 during the length of time consumed in passing longitudinally over this separator. Provision is made for taking care of this very occasional kind of tapered article by giving the same a period of treatment which automatically is determined by the length of time necessary to effect the desired result. This consists of a secondary, oscillatory separating member 136 which is transversely pivoted at 137 to a pair of brackets 139 which are suitably secured to the main frame of the machine. This auxiliary separating member is of channel shape having a transverse bottom plate 140 and a pair of upright transverse walls 141 rising from the opposite transverse edges of said bottom plate 140. Such tapered articles as are not properly separated by the main separator 105 remain, of course, on the main conveyor and travel along longitudinally with the same until they fall off the rear end thereof, whereupon they fall or drop upon the bottom plate 140 of said auxiliary separator. Secured to the latter is a downwardly projecting rock lever 142 whose extreme lower end is pivoted at 143 to a rock link 144. The latter is pivoted at its forward end at 145 to the crank arm 112 heretofore described. By this construction the auxiliary separating member is compelled to oscillate continuously and any tapered article that falls thereon is subjected to a separating action which endures until the tapered article is forced to fall, tail foremost over the one of the other side of said auxiliary separating member. This process is facilitated preferably by forming a plurality of transverse serrations 146 upon the upper surface of the bottom plate 140 of said auxiliary separator.

A modified method of separating the tapered articles laterally is shown in Fig. 15. Here instead of the oscillatory separator 105 a mesh or wire belt separator 147 is employed the same passing around a suitable pair of belt pulleys 149 and 150 which latter are journaled respectively on the main upper transverse conveyor shafts 60 and 61. The upper stretch of this mesh belt separator 105 travels forwardly toward the front of the machine, which is opposite to that of the travel of the upper stretch of the main conveyor chains 63. To obtain this result a large gear wheel 151 is secured to the main drive shaft 25 and meshes with a pinion gear 152 secured to a transverse jack shaft 153. The latter carries a large sprocket wheel 154 which drives a chain belt 155 whose upper turn engages with a small sprocket 156. The latter is secured to and thereby rotates the aforementioned pulley wheel 149 which, in turn, drives the mesh belt frictionally, or otherwise. The action of this mesh belt upon the tapered articles which it supports is quite similar in its action to that of the oscillatory separator heretofore described. That is, the tapered articles are moved longitudinally of the machine in a substantially transverse position by a main conveyor 63 and are subjected to a rolling action which is caused by a separator, the latter supporting said tapered articles and travelling longitudinally at a speed which is different from that of said conveyor. The action of the mesh belt separator 147 is best understood by imagining that the tapered article is constantly rolling longitudinally on said separator in an arc which curves outwardly in the direction of the point of the tapered article, and that despite the fact that it does not travel any appreciable amount of this arc, nevertheless it has been clearly shown by actual demonstration that the tapered article when rotated on a flat surface always does move longitudinally toward its tail end.

It is now apparent that this separator for tapered articles is not only automatic in its operation but absolutely and unfailingly reliable as well. Very careful provision is made for feeding only certain amounts of the tapered articles into the feeding hopper 41 of the machine. A number of successively operative provisions are made for ensuring that no more than one tapered article will be carried by any one rotatable flight 70. Provision is also made for constantly rolling the tapered article along so that any loose stems, leaves, etc. which project laterally from the tapered article will be packed or matted against the side of the article, and thus ensure the positive and proper separation of the same when it rides over either the oscillatory separator 105 or the mesh belt separator 147 as the case may be. An auxiliary separator 136 is also provided for any occasional tapered article which is not properly separated by the main separator. Furthermore, after the tapered articles are separated laterally, they are automatically caused to position themselves with their butts in absolute alinement with each other.

The particular machine illustrated in the drawings as embodying my invention is especially adapted to handle and align ears of corn in the husk.

In the operation of corn husking machines it is the general practice to place the individual ears of corn on the husker conveyor, by hand, in which case the butts are all aligned against a guide rail or other suitable device, and are thus carried past a circular saw or other means for removing the butt ends of the ears and release the husk so that the rolls of the husking machine can engage the same and remove it from the ear.

A decapitating saw or other suitable device may be operated near, or just beyond the ends of the conveyors 133, or the aligned ears may pass directly onto the conveyors of the husking machine, (not shown), also, those ears that may pass into the aligning device 136 may pass from the ends thereof directly onto the husking machine conveyors.

While I have described the action of the rolls 54 and 55 as tending to align tapered articles in a certain manner, it is obvious that by changing the direction of rotation of the rolls in any manner desired the tapered articles will be moved laterally into any desired alignment relative to the conveyor or to the sides of the feeding hopper, or any other member or gage that may be placed there.

For example, one decentering roll and the conveyor will operate to move a tapered article in a lateral direction, the only desideratum being that the article rest on the surface of the roll so there is tractive effect. One decentering roll and one centering roll may be used and the movement of the tapered article will still be in a lateral direction relative to its forward path of travel. Both rolls may be rotated or only the decentering roll rotated and the other roll simply acting as an additional support for the end of the tapered article. Thus I have provided a very simple and effective device for the lateral movement and alignment of tapered articles that are being conveyed in a forward direction.

Considering further, see Figs. 5 and 6 where I have illustrated means for moving articles along a frame work by means of a longitudinally moving conveyor, with a roller positioned longitudinally adjacent said frame for engaging and moving articles in a lateral direction relative to their former path of movement along said frame.

I claim as my invention:

1. An apparatus for aligning tapered articles comprising a frame, conveying means moving longitudinally of said frame for moving tapered articles therealong, a roller longitudinally disposed relative to said frame and positioned underneath said articles as moved along said frame for engaging said articles and moving the same laterally with respect to their longitudinal movement along said frame with means for imparting motion to said conveyor and said roller.

2. A separator for tapered articles comprising a frame, a longitudinally movable conveyor, a pair of longitudinally disposed decentering rolls journaled in said frame and having their upper peripheries moving in opposite directions, and transversely disposed conveyor flights secured to said conveyor and adapted to longitudinally carry the tapered articles which latter are disposed transversely relatively to their movement with said flights.

3. A separator for tapered articles comprising a frame, a longitudinally movable conveyor, an inner pair of longitudinally disposed decentering rolls journaled in said frame, an outer pair of centering rolls likewise journaled in said frame, the rolls of each pair having their upper peripheries moving in opposite directions and the upper peripheries of the outer pair of centering rolls being disposed above the upper peripheries of the inner pair of decentering rolls, and transversely disposed conveyor flights secured to said conveyor and adapted to longitudinally carry the transversely disposed tapered articles along the upper peripheries of both pairs of rolls.

4. A separator for tapered articles comprising a frame, a longitudinal decentering roll and a longitudinal centering roll journaled in said frame and disposed the one at a higher elevation than the other, and a longitudinally movable conveyor adapted to carry the tapered articles in a transverse position along the upper peripheries of said rolls.

5. A separator for tapered articles comprising a frame, a longitudinal decentering roll and a longitudinal centering roll journaled in said frame, means for rotating said rolls in the same direction, and a longitudinally movable conveyor adapted to carry the tapered articles in a transverse position along the upper peripheries of said rolls.

6. A separator for tapered articles comprising a frame, a pair of longitudinal rolls journaled in said frame, a conveyor chain movable longitudinally of said rolls and disposed therebetween, and flights secured to and projecting laterally from said conveyor chain and adapted to carry the tapered articles along the upper surfaces of said rolls.

7. A separator for tapered articles comprising a frame, a selection conveyor arranged in said frame, notched flights secured to and projecting laterally from said conveyor, and a removing comb having tines which project laterally into the path of said flights and pass through the said notches of said notched flights for removing all of the articles from said conveyor and directing the same therefrom.

8. A separator for tapered articles comprising a frame, a longitudinally-movable main conveyor, transverse rotatable flights arranged on said conveyor and having centrally thickened portions and tapered ends, and means for supplying the tapered articles to said conveyor.

9. A separator for tapered articles comprising a frame, a longitudinally-movable main conveyor, transverse flights journaled on said conveyor and tapered at their outer ends, and means for supplying tapered articles to said conveyor.

10. A separator for tapered articles comprising a frame, a transversely serrated supporting plate arranged in said frame, a longitudinally-movable main conveyor arranged above said supporting plate, and transverse flights arranged on said conveyor and adapted to carry the tapered articles in a transverse position.

11. A separator for tapered articles comprising a frame, a transversely serrated supporting plate, a longitudinally movable conveyor arranged above said supporting plate, transverse flights journaled on said conveyor.

12. A separator for tapered articles comprising a frame, a transversely serrated supporting plate, a longitudinally-movable main conveyor arranged above said supporting plate, and transverse flights tapered at their outer ends and journaled on said main conveyor.

13. A separator for tapered articles comprising a frame, a supporting plate, a main conveyor movable longitudinally of said supporting plate and adapted to move the tapered articles, flights arranged on said conveyor and projecting therefrom a less distance than do the said tapered articles, and a removing brush arranged in said frame and having its bristles in juxtaposition to the outer extremities of said flights.

14. A separator for tapered articles comprising a frame, a longitudinally-movable conveyor having transverse flights adapted to carry the tapered articles in a transverse position, a transversely serrated supporting plate disposed below said conveyor and operating to rotate the tapered articles in the one direction, and a removing brush operating to rotate the tapered articles in the opposite direction.

15. A separator for tapered articles comprising a frame, a longitudinally-movable main conveyor having transverse flights, means for positively removing an excess of tapered articles from said conveyor and means for effecting a subsequent separation of the tapering articles whereby same are caused to move in a different direction than the others.

16. A separator for tapered articles comprising a frame, a longitudinally-movable main conveyor having transverse flights, a knock-out spider journaled in said frame and having prongs which swing into the path of said conveyor and in juxtaposition to the rear faces of said flights and removing excess articles therefrom, and means for effecting a subsequent separation of the tapered articles whereby same are caused to move in a different direction than the others.

17. A separator for tapered articles comprising a frame, a longitudinally-movable main conveyor having transverse flights, a knock-out spider journaled transversely in said frame and rotated synchronously with the longitudinal movement of said flights and removing excess articles therefrom, and means for effecting a subsequent separation of the tapered articles whereby they are caused to move in lateral directions relative to their longitudinal line of travel.

18. A separator for tapered articles comprising a frame, a longitudinally-movable main conveyor having transverse flights, and a knock-out spider journaled in said frame and having prongs which swing up into the path of said conveyor, and a reversing brush rotated in the opposite direction from that of said spider and having its lower bristles in juxtaposition to the uppermost prongs of said spider.

19. A separator for tapered articles comprising a frame, a transversely serrated supporting plate, a conveyor, flights mounted on said conveyor, a removing brush mounted above said flights, and a knock-out spider rotated in the opposite direction from that of said removing brush and adapted to have its prongs extend upwardly into juxtaposition with the rear faces of the said flights.

20. A separator for tapered articles comprising a frame, a longitudinally-movable conveyor adapted to carry the tapered articles in a transverse position, and a separating member adapted to support said tapered articles and to move longitudinally in a direction opposite to that of said conveyor.

21. A separator for tapered articles comprising a frame, a longitudinally-movable conveyor, a longitudinally movable separating member, and means for oscillating said separating member in such manner that its speed relatively to said conveyor is the same in either direction.

22. A separator for tapered articles comprising a longitudinally movable conveyor adapted to carry the tapered articles in a transverse position, and a longitudinally-movable oscillatory separating member adapted to support the tapered articles.

23. A separator for tapered articles comprising a longitudinally movable conveyor adapted to carry the tapered articles in a transverse position, and a longitudinally-movable, oscillatory separating member provided with transverse serrations and adapted to support the tapered articles.

24. A separator for tapered articles comprising a longitudinally-movable, oscillatory separating member adapted to support the tapered articles, and means for longitudinally oscillating said separating member at a greater speed in the one direction than in the other.

25. A separator for tapered articles comprising a frame, a constant speed longitudinally-movable conveyor, an oscillatory separating member, a constant speed driving gear wheel mounted eccentrically in said frame, and a variable speed driven gear wheel meshing with said driving gear wheel and operating to actuate said separating member.

26. A separator for tapered articles comprising a frame, a longitudinally-movable conveyor, a separating member, a driving gear wheel eccentrically mounted in said frame and driven at constant speed, a driven gear wheel meshing with said driving gear wheel and likewise eccentrically mounted in said frame, and a connecting rod eccentrically pivoted at one end to said driven gear wheel and operatively connected at its other end with said separating member.

27. A separator for tapered articles comprising a frame, a conveyor, a separating member arranged adjacent to said conveyor and supporting said articles while the same are propelled by said conveyor, a rocker arm fulcrumed on said frame and connected with said separator member, and means for moving said rocker arm at a greater speed forwardly than rearwardly.

28. A separator for tapered articles comprising a frame, a conveyor, a separating member, a rocker arm fulcrumed on said frame and connected with said separator member, and means for moving said rocker arm at a greater speed forwardly than rearwardly, comprising a pair of gear wheels, each eccentically mounted in said frame and the one driven at a constant rotative speed and the other operatively connected with said rocker arm.

29. A separator for tapered articles comprising a conveyor, a primary separating member arranged beneath said conveyor, and a secondary separating member arranged adjacent to the rear end of said conveyor.

30. A separator for tapered articles comprising a conveyor, a primary separating member arranged beneath said conveyor and moved at a speed which is different from but depends upon that of said conveyor, and a secondary separating member which is disassociated from said conveyor and may be moved at a speed which is independent of the speed of said conveyor.

31. A separator for tapered articles comprising a conveyor, a primary separating member adapted to separate the tapered articles which have a sharp taper, and a secondary separating member which receives its supply from said primary separating member and is adapted to separate the tapered articles which are nearly cylindrical.

32. A separator for tapered articles comprising a frame, a conveyor, a rocker arm pivoted on said frame, a primary separating member actuated by said rocker arm, and a secondary separating member likewise actuated by said rocker arm.

33. A separator for tapered articles comprising a frame, a conveyor, a longitudinally-movable primary separating member arranged beneath said conveyor, and a secondary oscillatory separating member pivoted to the frame and arranged adjacent to and below the rear end of said conveyor.

34. A separator for tapered articles comprising a frame, a longitudinally-movable conveyor adapted to carry the tapered articles in a transverse position, a longitudinally-movable separating member adapted to move the tapered articles laterally, and a longitudinal transfer roll journaled in said frame and adapted to further move said tapered articles laterally.

35. A separator for tapered articles comprising a frame, a longitudinally-movable conveyor adapted to carry tapered articles, means for separating said tapered articles and moving the same laterally away from said conveyor, and a longitudinally movable carrier adapted to receive the tapered articles which are moved away from said conveyor.

36. A separator for tapered articles comprising a longitudinally-movable conveyor adapted to carry tapered articles, means for separating said tapered articles and moving the same laterally away from said conveyor, and a longitudinally journaled transfer roll adapted to control the amount of the said lateral movement of said separated, tapered articles.

37. A separator for tapered articles comprising a longitudinally-movable conveyor adapted to carry tapered articles, means for separating said tapered articles and moving the same laterally away from said conveyor, a longitudinally journaled transfer roll adapted to control the amount of the said lateral movement of said separated, tapered articles, and a carrier adapted to impart only a longitudinal movement to said tapered articles after their lateral movement has been definitely determined by said removal roll.

38. A separator for tapered articles comprising a frame, a pair of transverse shafts journaled in said frame and provided with sprocket wheels, an endless conveyor and an endless carrier both engaging with the aforesaid sprockets, and means for separating and laterally moving the tapered articles from said conveyor to said carrier.

39. A separator for tapered articles comprising a frame, a pair of upper transverse shafts journaled in said frame and provided with sprocket wheels, a carrier engaging with the said sprockets of said upper transverse shafts, a lower transverse shaft also journaled in said frame and also provided with sprockets, a conveyor engaging with both the sprockets of said upper transverse shafts and also with the sprockets of said lower transverse shaft, and means for laterally separating and moving the tapered articles from said conveyor to said carrier.

40. The process of handling tapered articles consisting of longitudinally and bodily carrying the articles in a transverse position and at the same time causing the tapered articles to be rotated by means of a separator which engages the periphery of said tapered articles and moves in a longitudinal direction at a different speed than the speed of said conveyor.

41. A machine of the character described, comprising means for conveying the articles to be assorted, and longitudinally reciprocating supporting means for rolling and vibrating the same while being conveyed.

42. A separator for tapered articles comprising a frame, a supporting plate and a conveyor each movable in parallel planes and mounted in superposed relation, said conveyor having flights attached thereto for carrying tapered articles.

43. A separator for tapered articles comprising a frame, a longitudinally movable supporting plate, and a longitudinally movable conveyor arranged above said supporting plate for carrying tapered articles.

44. A separator for tapered articles comprising a frame, a supporting plate, a main conveyor movable longitudinally of said supporting plate and adapted to move articles, flights arranged on said conveyor and projecting therefrom a less distance than do the said articles, and a moving member arranged in said frame above said conveyor and contacting with articles carried by said conveyor to remove the same therefrom.

45. In a machine for handling and aligning elongated articles the combination of means for supplying a quantity of articles, a series of conveying and transfer means cooperating in a manner to move elongated articles in two directions relative to their axes, one of said means operating after the other ceases to act, whereby selected ends of said articles will be placed in alignment for subsequent operation.

46. A machine for handling and segregating articles comprising a plurality of conveyors mounted to operate in tandem, means on one of said conveyors for positively engaging and successively moving articles from a promiscuously arranged supply, means for transferring articles from said conveyor to a tandem conveyor where said articles are moved in the same general line of travel, means operating in conjunction with said conveyor to move said articles laterally to their normal line of travel for the purpose of aligning and positioning said articles for subsequent operations.

47. A machine for handling and segregating elongated articles comprising separated conveying means mounted to operate in the same lineal direction, one of said conveyors being adapted to select and move articles from a promiscuously arranged supply, means whereby articles selected by said conveyor are transferred to another conveyor where they are conveyed in the same lineal direction, cooperating movable means for engaging said articles and giving them lateral movement whereby they are positioned and aligned for subsequent operations.

48. A machine for handling and aligning elongated articles comprising a plurality of conveying means mounted to operate in the same lineal direction, one of said conveyors being adapted to select articles from a promiscuously arranged supply and deliver said articles in aligned relation to another of said conveying means where said articles are progressed in the same general direction, cooperating movable means for imparting lateral movement to said articles whereby their outer ends are aligned for subsequent operations.

49. An apparatus for handling and aligning elongated articles comprising a series of cooperating conveying means, the first of said means being adapted to select articles from a promiscuously arranged supply and deliver them successively in parallel relation to the second of said series of conveying means, which second conveying means moves said articles into the operative zone of the third of said series of conveying means where said articles are given lateral movement and are gradually moved away from the control of said second series of conveying means and passed into the control of the fourth of said series of conveying means where said articles assume the final desired position of alignment.

50. An apparatus for handling and aligning elongated articles comprising a series of conveying means operating in the same lineal direction whereby elongated articles are selected from a promiscuously arranged supply, are given longitudinal and lateral movement through the combined action of said series of conveying means, transfer means operating in conjunction with said conveying means whereby said articles are caused to assume positions of alignment with selected ends of said articles all pointing in the same general direction for subsequent operations.

51. An apparatus comprising a series of conveyors all moving in the same general direction and adapted to move elongated tapered articles, reciprocating means for engaging articles while being moved by one of said series of conveyors and imparting lateral movement thereto, transfer means for moving said articles to other conveyors of said series whereby selected ends of said articles are placed in alignment.

52. In a machine for handling and aligning elongated articles the combination of means for automatically supplying measured quantities of elongated articles, a conveyor for selecting articles from said supply and moving the same in a lineal direction at approximately right angles to their axes, a companion conveyor for receiving said articles and moving them in the same manner, auxiliary transfer means for imparting axial movement to said articles while being moved by said companion conveyor and thus causing said articles to pass out of the control of said conveyor and assume aligned positions.

53. In a machine for handling and aligning elongated articles the combination of conveying means for articles, a housing for containing said conveying means, resilient means supporting one end of said housing, a measuring device mounted adjacent said housing for controlling the flow of articles, said measuring device being operated by the deflection of said housing through the presence of a measured quantity of articles resting in said housing.

54. In a machine for handling and aligning elongated articles the combination of conveying and aligning means, a housing for containing said conveying and aligning means and having vertical movement, resilient means supporting one end of said housing, an article supply means comprising an interrupting device for controlling the flow of articles and mounted adjacent the movable end of said housing, said interrupting device being operable from the vertical movement of said resiliently supported housing.

55. A machine for handling and aligning ears of corn in the husk and aligning the butt ends of said ears for severance of said butts comprising a hopper carrying a supply of corn, a flow control device in said hopper, a housing for receiving said corn from said hopper as admitted by said flow control device, a series of conveyors and aligning devices mounted in and on said housing for receiving and manipulating said ears of corn whereby the butts thereof are placed in alignment for severance.

EDWARD D. SMITH.